US005882788A

United States Patent [19]

Raley

[11] Patent Number: 5,882,788

[45] Date of Patent: Mar. 16, 1999

[54] HINGE TAPE

[76] Inventor: Jeffrey Alan Raley, 27260 Queentree Rd., Mechanicsville, Md. 20659

[21] Appl. No.: 58,574

[22] Filed: Apr. 10, 1998

[51] Int. Cl.$^{6}$ .......... B32B 7/12

[52] U.S. Cl. .......... 428/343; 428/40.1

[58] Field of Search .......... 428/343, 40.1, 428/42.1

[56] References Cited

U.S. PATENT DOCUMENTS

| | | | |
|---|---|---|---|
| 4,430,137 | 2/1984 | Jones | 428/40.1 X |
| 4,722,296 | 2/1988 | Bowskill et al. | 428/40.1 X |
| 5,770,289 | 6/1998 | Tracy | 428/40.1 |
| 5,792,537 | 8/1998 | Ohlin, Jr. | 428/343 X |

*Primary Examiner*—Daniel Zirker
*Attorney, Agent, or Firm*—David Newman Chartered

[57] ABSTRACT

An apparatus for covering a hinge during painting. The apparatus includes four pieces of adhesive material such as tape. Each piece of adhesive material is constructed to precisely cover a portion of the hinge. The design of the four pieces of adhesive material enables the hinge, when the four pieces are properly adhered, to move freely without loosening the pieces of adhesive material.

10 Claims, 1 Drawing Sheet

HINGE TAPE

BACKGROUND OF THE INVENTION

This invention relates to covering surfaces not to be painted and more particularly to a novel apparatus for covering hinges during painting of the adjacent door and room.

DESCRIPTION OF THE RELEVANT ART

Before doors and rooms can be painted, whether in new construction or during remodeling, door hardware that is not to be painted has to be taped or otherwise covered. This is especially true today as most new construction is painted using pressure sprayers and so areas that are not to be painted cannot be painted around easily or effectively.

In the prior art, door hinges are covered with tape dispensed from basic rolls. A piece of tape of approximately the right length is torn from the roll and folded and/or cut to cover the overall shape of the hinge. The problem in the prior art is that the hinges may be taped one day and then not painted until the next day. In the meantime, the doors are opened and closed by other construction workers, contractors, etc., pushing the hinges through their range of motion. Taping in the prior art cannot accommodate this movement under the tape. As a result of the movement of the door the tape is loosened so that, by the time the room is to be painted, the tape has often been either partly or completely pulled off, necessitating reapplication of the tape. Even if the room is painted the same day it is taped, the room must still be repainted on a subsequent day, meaning the same problem of door movement and tape loss is again encountered. Before the painting process is complete, door hinges often must be retaped several times, which wastes a lot of time as well as tape.

SUMMARY OF THE INVENTION

A general object of the invention is a covering for hinges of adhesive material that tolerates movement without loosening.

Another object of the invention is a covering for hinges that is easily applied and which remains intact during the entire painting sequence of an adjacent door and room so that no reapplication of tape is necessary.

An additional object of the invention is a custom covering for hinges that protects the hinge against paint application so that the need for subsequent clean-up of the hinge after painting is avoided.

According to the present invention, as embodied and broadly described herein, an apparatus of adhesive material that is easily applied to hinges and that tolerates movement of the hinge without loosening is provided. The apparatus of the present invention includes four pieces of adhesive material such as tape. Each piece of tape is constructed to precisely cover a portion of the hinge without impairing the hinge's intended motion. A first piece covers the exposed face of one of the two hinge mounting plates as well as part of the rotating portions of the plate. A second piece covers the exposed face of the other hinge mounting plate as well as part of the rotating portions of that plate. A third piece covers a longitudinal strip on the back of the first mounting plate that is exposed when the door is hung. This third piece also covers a remainder of the rotating portions of the first plate. Finally, a fourth piece covers a longitudinal strip on the back of the second mounting plate that is exposed when the door is hung. This fourth piece also covers a remainder of the rotating portions of the second plate. Because of the design of the four pieces of adhesive material, when the four pieces are properly adhered to the hinge, the hinge is free to function without loosening the pieces of adhesive material.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1A:
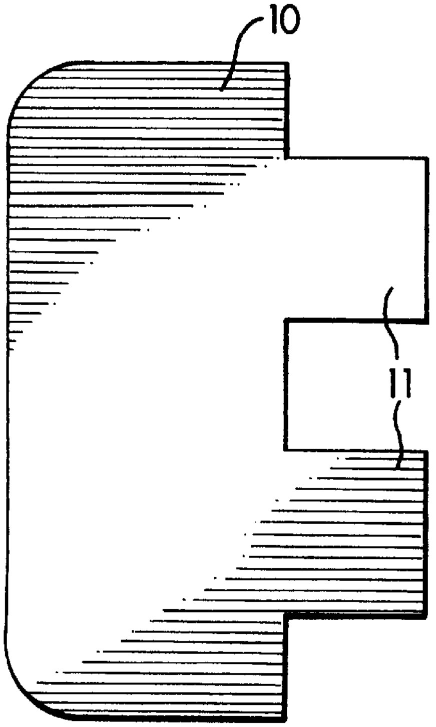
FIG. 1A illustrates a first piece of the apparatus of the present invention.

Reference now is made in detail to the present preferred embodiments of the invention, examples of which are illustrated in the accompanying drawings, wherein like reference numerals indicate like elements throughout the several views.

The apparatus of the present invention is used to cover a hinge during painting of an adjacent door so as to prevent the hinge from being painted. A standard hinge, as is known in the art, has a first mounting plate integrally connected to two rotating portions, and a second mounting plate integrally connected to three rotating portions. Each of the rotating portions has a hollow center. The two rotating portions of the first plate interlock with the three rotating portions of the second plate and are held in the interlocked relationship by a straight member having a head. The straight member is inserted through the hollow center of each rotating portion, locking the two mounting plates in a relationship to each other and allowing the hinge to open and close through rotation of the rotating portions of the first plate relative to the rotating portions of the second plate around the straight member.

As is known in the art, the first mounting plate of the hinge has a front surface and a back surface. Similarly, the second mounting plate also has a front surface and a back surface. The front surface of the first mounting plate and the front surface of the second mounting plate are visible after the door has been hung. By contrast, the back surface of the first mounting plate is not visible once the door has been hung, with the exception of a first longitudinal strip adjacent to the two rotating portions. Similarly, the back surface of the second mounting plate is not visible once the door has been hung, with the exception of a second longitudinal strip adjacent to the three rotating portions.

The apparatus of the present invention includes four pieces of adhesive material, preferably adhesive on only one side. The adhesive material may be embodied as tape, stickers or any other substance where the adhesive is exposed but rolled, such as masking tape, or where the adhesive is covered with a backing that is peeled off to expose the adhesive just prior to application, such as labels or self-adhesive stamps. For the purposes of this patent, "tape" shall be defined to include any adhesive material of the types just described. Each piece of adhesive material is constructed to precisely cover a portion of the hinge without impairing the hinge's intended range of motion.

As illustratively shown in FIG. 1A, the first piece of adhesive material has a rectangular body 10, with two corners at right angles joined by a first long side and with two corners being curved and joined by a second long side. The resulting shape as shown in FIG. 1A approximates the shape of the front surface of the first mounting plate of the hinge. This first piece of adhesive material further includes two rectangular protrusions 11 that extend from the first long side. These two rectangular protrusions extend from the rectangular body 10 so as to be in alignment with the two rotating portions, respectively, of the first mounting plate. Each protrusion has approximately the same width as the respective rotating portion. In the preferred embodiment, each of the two rectangular protrusions has a length of between one and a half and two centimeters, and a width of approximately two centimeters.

Figure 1B:
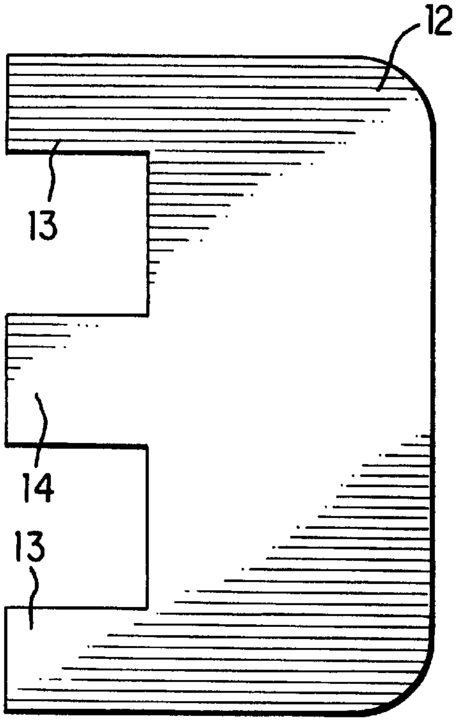
FIG. 1B illustrates a second piece of the apparatus of the present invention.

As illustratively shown in FIG. 1B, the second piece of adhesive material has a rectangular body 12, with two corners at right angles joined by a third long side and with two corners being curved and joined by a fourth long side. The resulting shape as shown in FIG. 1B approximates the shape of the front surface of the second mounting plate of the hinge. The second piece of adhesive material further includes three rectangular protrusions extending from the third long side. These protrusions include upper and lower protrusions 13 and one center protrusion 14. These three rectangular protrusions 13, 14 extend from the rectangular body 12 so as to be in alignment with the three rotating portions, respectively, of the second mounting plate. Each protrusion has approximately the same width as a respective rotating portion. In the preferred embodiment, the upper and lower protrusions 13 each have a length of between one and a half and two and a half centimeters, and a width of between one and one and a half centimeters. In the preferred embodiment, the center protrusion 14 has a length of between one and a half and two and a half centimeters, and a width of between one and a half and two centimeters.

Figure 1C:
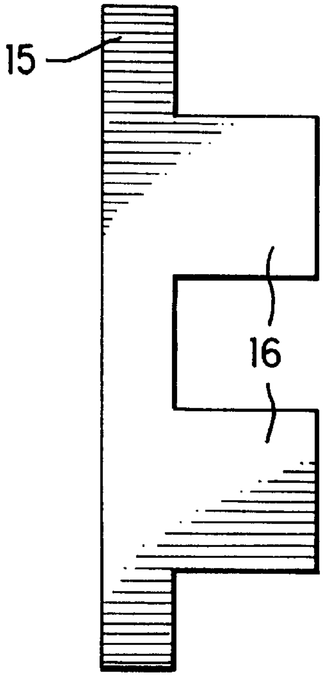
FIG. 1C illustrates a third piece of the apparatus of the present invention.

As shown in FIG. 1C, the third piece of adhesive material has a rectangular body 15 and two rectangular protrusions 16 extending from one long side of the rectangular body 15. The length and width of the rectangular body 15 is approximately equal to the length and width, respectively, of the first longitudinal strip of the back surface of the first mounting plate that is visible after the door has been hung. The two rectangular protrusions 16 extend from the rectangular body 15 so as to be in alignment with the two rotating portions, respectively, of the first mounting plate. Each protrusion has approximately the same width as a respective rotating portion. In the preferred embodiment, each of the two rectangular protrusions 16 has a length of between one and a half and two centimeters, and a width of approximately two centimeters.

Figure 1D:
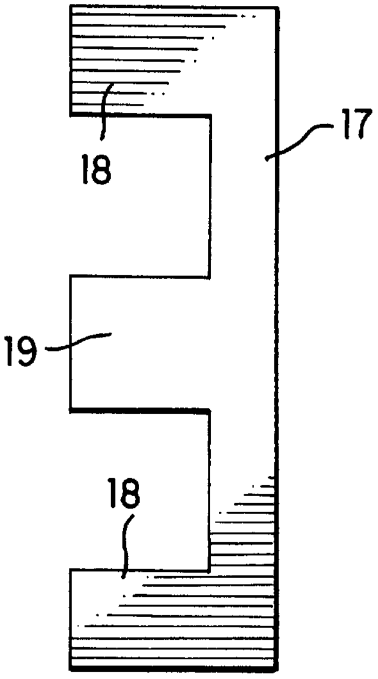
FIG. 1D illustrates a fourth piece of the apparatus of the present invention.

As shown in FIG. 1D, the fourth piece of adhesive material has a rectangular body 17 and three rectangular protrusions. The three rectangular protrusions include upper and lower protrusions 18 and one center protrusion 19. The length and width of the rectangular body 17 is approximately equal to the length and width, respectively, of the second longitudinal strip of the back surface of the second mounting plate that is visible after the door has been hung. The three rectangular protrusions 18, 19 extend from the rectangular body 17 so as to be in alignment with the three rotating portions, respectively, of the second mounting plate. Each protrusion has approximately the same width as a respective rotating portion. In the preferred embodiment, each of the upper and lower protrusions 18 has a length of between one and a half and two and a half centimeters, and a width of between one and one and a half centimeters. In the preferred embodiment, the center protrusion 19 has a length of between one and a half and two and a half centimeters, and a width of between one and a half and two centimeters.

In use, the door which is to be painted is placed in an open position to expose the front surfaces of the mounting plates of the hinge. The edges of the rectangular body 10 of the first piece of adhesive material are aligned with the edges of the first mounting plate and adhered thereto. The two protrusions 11, being aligned with the two rotating portions of the first mounting plate, are wrapped around the rounded face of the two rotating portions, respectively, and adhered thereto.

The edges of the rectangular body 12 of the second piece of adhesive material are aligned with the edges of the second mounting plate and adhered thereto. The three protrusions 13, 14, being aligned with the three rotating portions of the second mounting plate, are wrapped around the rounded face of the three rotating portions, respectively, and adhered thereto.

The door is then closed to facilitate access to the back surfaces of the mounting plates. The edges of the rectangular body 15 of the third piece of adhesive material are aligned with the edges of the exposed surface of the back of the first mounting plate and adhered thereto; this exposed surface constitutes the first longitudinal strip. The two protrusions 16, being aligned with the two rotating portions of the first mounting plate, are wrapped around the rounded face of the two rotating portions, respectively, and adhered thereto. The two protrusions 16, when properly in place, should overlap slightly with the two protrusions 11, respectively, of the first piece of adhesive material, already in place.

The edges of the rectangular body 17 of the fourth piece of adhesive material are aligned with the edges of the exposed surface of the back of the second mounting plate and adhered thereto; this exposed surface constitutes the second longitudinal strip. The three protrusions 18, 19, being aligned with the three rotating portions of the second mounting plate, are wrapped around the rounded face of the three rotating portions, respectively, and adhered thereto. The three protrusions 18, 19, when properly in place, should overlap slightly with the three protrusions 13, 14, respectively, of the second piece of adhesive material, already in place.

Once the apparatus of the present invention has been properly applied, the hinge is completely covered and yet may operate freely to allow the door to be opened and closed. The design of the adhesive material removes stress from the adhesive material, and enables the hinge to be taped just once, saving time and money.

The apparatus of the present invention may be easily extended to accommodate non-standard hinges having different dimensions from these described in connection with the preferred embodiment. Through adjustment in the shape and dimensions of the body and protrusions of each piece of adhesive material, the present invention may be used effectively with any type of hinge and for any purpose requiring a temporary but highly effective hinge covering.

It will be apparent to those skilled in the art that various modifications can be made to the hinge tape of the instant invention without departing from the scope or spirit of the invention, and it is intended that the present invention cover modifications and variations of the hinge tape provided they come within the scope of the appended claims and their equivalents.

I claim:

1. An apparatus for covering a hinge during painting of an adjacent door, the hinge having a first mounting plate integrally connected to two rotating portions, and a second mounting plate integrally connected to three rotating portions, the first mounting plate having a front surface and a back surface, the second mounting plate having a front surface and a back surface, the front surface of the first mounting plate and the front surface of the second mounting plate being visible when the door is hung, only a first longitudinal strip of the back surface of the first mounting plate, adjacent to the two rotating portions, being visible when the door is hung, and only a second longitudinal strip of the back surface of the second mounting plate, adjacent to the three rotating portions, being visible when the door is hung, the apparatus comprising:

a first piece of adhesive material having a first body approximately a same shape as the front surface of the first mounting plate of the hinge, said first piece of adhesive material further including two rectangular protrusions extending from one side of the first body, said two rectangular protrusions spaced to extend in alignment with the two rotating portions, respectively;

a second piece of adhesive material having a second body approximately a same shape as the front surface of the second mounting plate of the hinge, said second piece of adhesive material further including three rectangular protrusions extending from one side of the second body, said three rectangular protrusions spaced to extend in alignment with the three rotating portions, respectively;

a third piece of adhesive material having a first rectangular body, a length and width of the first rectangular body approximately equal to a length and width, respectively, of the first longitudinal strip of the back surface of the first mounting plate, said third piece of adhesive material further including two rectangular protrusions extending from one long side of the first rectangular body, said two rectangular protrusions spaced to extend in alignment with the two rotating portions, respectively; and a fourth piece of adhesive material having a second rectangular body, a length and width of the second rectangular body approximately equal to a length and width, respectively, of the second longitudinal strip of the back surface of the second mounting plate, said fourth piece of adhesive material further including three rectangular protrusions extending from one long side of the second rectangular body, said three rectangular protrusions spaced to extend in alignment with the three rotating portions, respectively.

2. The apparatus as set forth in claim 1, with each of said two rectangular protrusions of said first piece of adhesive material having a length of between one and a half and two centimeters, and a width of approximately two centimeters.

3. The apparatus as set forth in claim 1, with an upper and a lower protrusion of said three rectangular protrusions of said second piece of adhesive material having a length of between one and a half and two and a half centimeters, and a width of between one and one and a half centimeters, and with a center protrusion of said three rectangular protrusions of said second piece of adhesive material having a length of between one and a half and two and a half centimeters, and a width of between one and a half and two centimeters.

4. The apparatus as set forth in claim 1, with each of said two rectangular protrusions of said third piece of adhesive material having a length of between one and a half and two centimeters, and a width of approximately two centimeters.

5. The apparatus as set forth in claim 1, with an upper and a lower protrusion of said three rectangular protrusions of said fourth piece of adhesive material having a length of between one and a half and two and a half centimeters, and a width of between one and one and a half centimeters, and with a center protrusion of said three rectangular protrusions of said fourth piece of adhesive material having a length of between one and a half and two and a half centimeters, and a width of between one and a half and two centimeters.

6. An apparatus for covering a hinge during painting of an adjacent door, the hinge having a first mounting plate integrally connected to two rotating portions, and a second mounting plate integrally connected to three rotating portions, the first mounting plate having a front surface and a back surface, the second mounting plate having a front surface and a back surface, the front surface of the first mounting plate and the front surface of the second mounting plate being visible when the door is hung, only a first longitudinal strip of the back surface of the first mounting plate, adjacent to the two rotating portions, being visible when the door is hung, and only a second longitudinal strip of the back surface of the second mounting plate, adjacent to the three rotating portions, being visible when the door is hung, the apparatus comprising:

a first piece of adhesive material having a rectangular body, with two corners at right angles joined by a first long side and with two corners being curved and joined by a second long side such that the rectangular body of said first piece of adhesive material approximates in shape the front surface of the first mounting plate of the hinge, said first piece of adhesive material further including two rectangular protrusions extending from the first long side, said two rectangular protrusions extending from the rectangular body of said first piece of adhesive material in alignment with the two rotating portions, respectively, and each protrusion of approximately a same width as a respective rotating portion;

a second piece of adhesive material having a rectangular body, with two corners at right angles joined by a third long side and with two corners being curved and joined by a fourth long side such that the rectangular body of said second piece of adhesive material approximates in shape the front surface of the second mounting plate of the hinge, said second piece of adhesive material further including three rectangular protrusions extending from the third long side, said three rectangular protrusions extending from the rectangular body of said second piece of adhesive material in alignment with the three rotating portions, respectively, and each protrusion of approximately a same width as a respective rotating portion;

a third piece of adhesive material having a rectangular body, a length and width of the rectangular body of said third piece of adhesive material approximately equal to a length and width, respectively, of the first longitudinal strip of the back surface of the first mounting plate, said third piece of adhesive material further including two rectangular protrusions extending from one long side of the rectangular body of said third piece of adhesive material, said two rectangular protrusions extending from the rectangular body of said third piece of adhesive material in alignment with the two rotating portions, respectively, and each protrusion of approximately a same width as a respective rotating portion; and a fourth piece of adhesive material having a rectangular body, a length and width of the rectangular body of said fourth piece of adhesive material approximately equal to a length and width, respectively, of the second longitudinal strip of the back surface of the second mounting plate, said fourth piece of adhesive material further including three rectangular protrusions extending from one long side of the rectangular body of said fourth piece of adhesive material, said three rectangular protrusions extending from the rectangular body of said fourth piece of adhesive material in alignment with the three rotating portions, respectively, and each protrusion of approximately a same width as a respective rotating portion.

7. The apparatus as set forth in claim 6, with each of said two rectangular protrusions of said first piece of adhesive material having a length of between one and a half and two centimeters, and a width of approximately two centimeters.

8. The apparatus as set forth in claim 6, with an upper and a lower protrusion of said three rectangular protrusions of said second piece of adhesive material having a length of between one and a half and two and a half centimeters, and a width of between one and one and a half centimeters, and with a center protrusion of said three rectangular protrusions of said second piece of adhesive material having a length of between one and a half and two and a half centimeters, and a width of between one and a half and two centimeters.

9. The apparatus as set forth in claim 6, with each of said two rectangular protrusions of said third piece of adhesive material having a length of between one and a half and two centimeters, and a width of approximately two centimeters.

10. The apparatus as set forth in claim 6, with an upper and a lower protrusion of said three rectangular protrusions of said fourth piece of adhesive material having a length of between one and a half and two and a half centimeters, and a width of between one and one and a half centimeters, and with a center protrusion of said three rectangular protrusions of said fourth piece of adhesive material having a length of between one and a half and two and a half centimeters, and a width of between one and a half and two centimeters.

* * * * *